United States Patent [19]
Hamamoto

[11] Patent Number: 5,192,094
[45] Date of Patent: Mar. 9, 1993

[54] EXPANSION PIPE JOINT
[75] Inventor: Kiyoshi Hamamoto, Suita, Japan
[73] Assignee: Yano Giken Co., Ltd., Osaka, Japan
[21] Appl. No.: 829,897
[22] Filed: Feb. 3, 1992
[30] Foreign Application Priority Data
  Feb. 8, 1991 [JP] Japan ................... 3-17187
[51] Int. Cl.⁵ ........................................... F16L 27/04
[52] U.S. Cl. .................................. 285/165; 285/168
[58] Field of Search ............... 285/165, 168, 169, 302, 285/166, 163

[56] References Cited
U.S. PATENT DOCUMENTS

| | | | |
|---|---|---|---|
| 2,713,503 | 7/1955 | Ekholm | 285/166 |
| 2,955,850 | 10/1960 | Bellinger | 285/165 X |
| 3,002,771 | 10/1961 | Chakroff | 285/165 |
| 3,133,754 | 5/1964 | Peters | 285/165 |
| 3,353,848 | 11/1967 | Bleasby | 285/165 X |
| 3,515,414 | 6/1970 | Kowalewski | 285/165 |
| 3,695,644 | 10/1972 | Goldberg | 285/166 |
| 3,938,833 | 2/1976 | Miyaoka | 285/166 |
| 4,135,742 | 1/1979 | Anderson | 285/165 X |
| 4,706,998 | 11/1987 | Peppel et al. | 285/302 |

FOREIGN PATENT DOCUMENTS

| | | | |
|---|---|---|---|
| 56-23786 | 3/1981 | Japan . | |
| 2066399 | 7/1981 | United Kingdom | 285/165 |

Primary Examiner—Eric K. Nicholson
Attorney, Agent, or Firm—Webb, Burden, Ziesenheim & Webb

[57] ABSTRACT

An expansion pipe joint includes an inner sleeve having an annular projection formed on an outer surface thereof, and an outer sleeve surrounding the inner sleeve and having an annular groove formed on an inner surface thereof. An elastic ring is mounted in the annular groove for engaging the annular groove and the annular projection. The inner and outer sleeves are axially slidable relative to and inseparable from each other. The outer sleeve defines an end portion for allowing the annular projection to be inserted deeper inside than the ring.

6 Claims, 7 Drawing Sheets

EXPANSION PIPE JOINT

BACKGROUND OF THE INVENTION

1. Field of the Invention

The present invention relates to expansion pipe joints for extendibly and contractibly connecting pipes, and more particularly to an expansion pipe joint including an inner sleeve axially slidably mounted in an outer sleeve and retained against detachment from the outer sleeve.

2. Description of the Related Art

Expansion pipe joints as noted above include a flexible expansion pipe joint. Conventionally, a flexible expansion pipe joint has a retainer ring fixed to an outer surface of the inner sleeve, and fitted in a broad annular groove formed on an inner surface of the outer sleeve. The inner sleeve is retained in place inside the outer sleeve by contact between the ring and an inside wall of the annular groove (see Japanese Utility Model Publication Kokai No. 1981-23786, for example).

This pipe joint has the disadvantage of requiring great trouble in attaching the ring in that the ring is fixed to the outer surface of the inner sleeve to retain the inner sleeve in place. Particularly where the ring is inserted into and fixed to an annular groove formed on the outer surface of the inner sleeve, the inner sleeve has a wall thickness partly reduced for the annular groove, resulting in a disadvantage in terms of strength.

SUMMARY OF THE INVENTION

The present invention has been made having regard to the state of the art noted above, and its object is to provide an expansion pipe joint having an improved ring mounting structure which facilitates placement of a retainer ring while assuring strength, and renders an inner sleeve inseparable from an outer sleeve without fixing the ring to the inner sleeve.

The above object is fulfilled, according to the present invention, by an expansion pipe joint comprising an inner sleeve axially slidably mounted in an outer sleeve, the inner sleeve being inseparable from the outer sleeve, wherein the outer sleeve includes an annular groove formed on an inner surface thereof, the inner sleeve includes an annular projection formed on an outer surface thereof, a ring being mounted in the annular groove for engaging the annular groove and the annular projection along a circumferential direction, the outer sleeve defines an end portion for allowing the annular projection to be placed deeper inside than the ring, the ring is elastically deformable radially outwardly, and the annular projection is placed deeper inside than the ring by elastically deforming the ring radially outwardly in the annular groove.

The above construction has the following functions and advantages.

The ring is engageable with the annular groove formed on the outer sleeve to perform a retaining function. When the annular projection placed deeper inside than the ring moves outwardly, the annular projection is engaged by the ring, thereby being stopped from separating from the outer sleeve.

Thus, the inner sleeve is inseparable from the outer sleeve simply by means of the ring fitted between the two sleeves without fixing the ring to the inner sleeve. This facilitates placement of the ring, and dispenses with the necessity to form an annular groove on the inner sleeve, resulting in an advantage in terms of strength.

In a preferred embodiment of the present invention, a maximum insertion depth between the two sleeves may be determined by contact between the above-mentioned annular projection and a projection formed on the inside surface of the outer sleeve. This construction provides the advantage of setting a range of relative sliding movement between the two sleeves without requiring a restricting device specially for limiting amount of insertion of the inner sleeve.

Other features and advantages of the present invention will be apparent from the following description.

DETAILED DESCRIPTION OF THE PREFERRED EMBODIMENTS

Expansion pipe joints embodying the present invention will be described in detail hereinafter with reference to the drawings.

Figure 1:
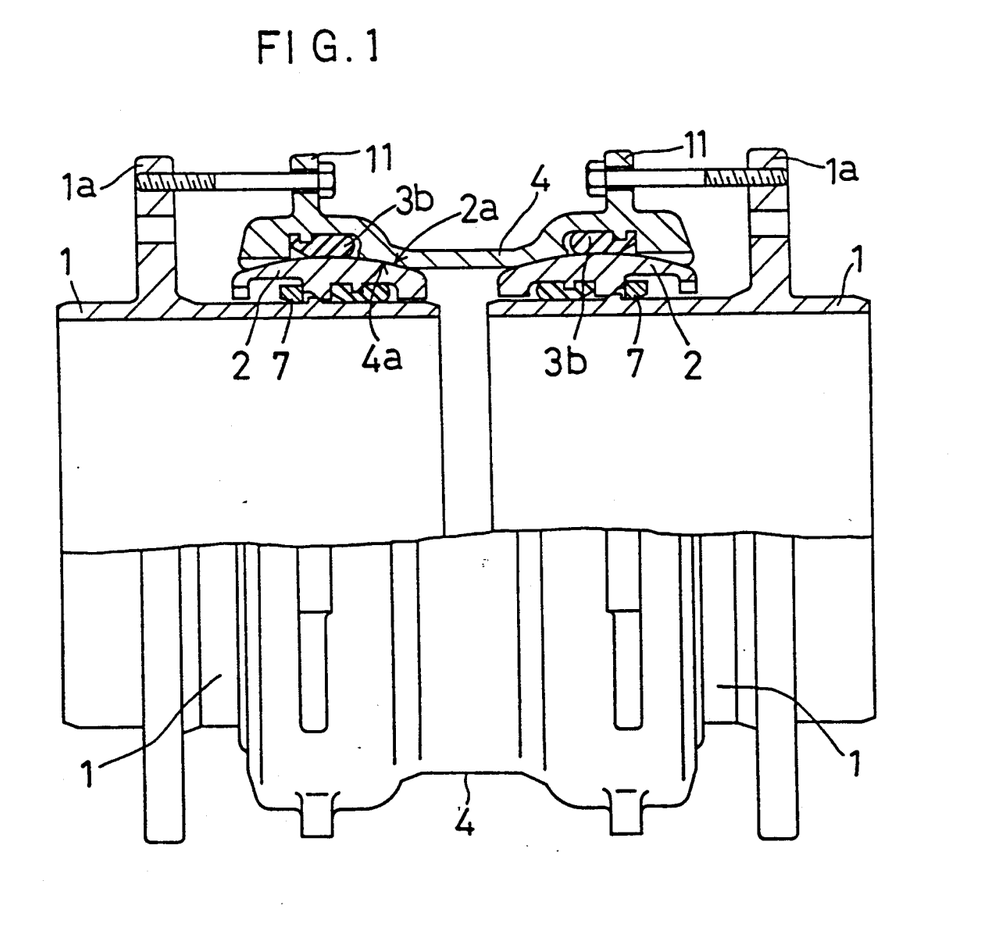
FIG. 1 is a side view partly in section of a flexible pipe joint according to the present invention.
Figure 2:
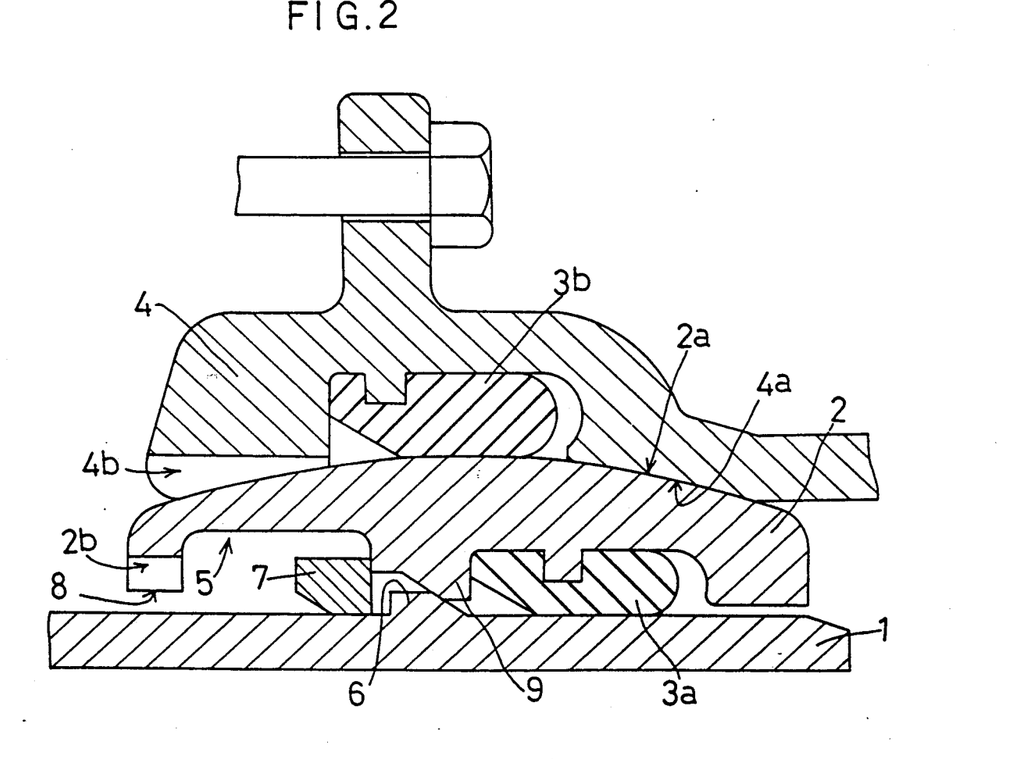
FIG. 2 is an enlarged sectional view of a principal portion of the pipe joint.

FIGS. 1 and 2 show a flexible pipe joint which is one example of expansion pipe joints. This flexible pipe joint comprises two sleeve sets, each set including a sleeve pipe 1 which is one example of inner sleeves, and an annular intermediate sleeve 2 which is one example of outer sleeves. The sleeve pipe 1 is axially slidably mounted in the intermediate sleeve 2 with a rubber ring 3a in between. The two sets are interconnected through a casing pipe 4 to be in bilateral symmetry. Each sleeve pipe 1 includes a flange 1a to which a pipe is connected through a connecting collar (not shown).

The casing pipe 4 surrounds each intermediate sleeve 2 with a rubber ring 3b in between. The intermediate sleeve 2 defines a spherical outer surface 2a contacting a spherical inner surface 4a of the casing pipe 4. The pipes connected to the flanges 1a of the right and left sleeve pipes 1 are coupled to each other to be extendible and contractible with relative slides between the sleeve pipes 1 and intermediate sleeves 2, and to be flexible with relative slides between the spherical outer surfaces 2a of the intermediate sleeves 2 and the spherical inner surfaces 4a of the casing pipe 4.

The flexible pipe joint includes an annular groove 5 formed on an inner peripheral wall of each intermediate sleeve 2, an annular projection 6 formed on an outer peripheral wall of each sleeve pipe 1, and a ring 7 mounted in the annular groove 5 to be engageable with the annular groove 5 and annular projection 6 along the circumferential direction. The intermediate sleeve 2 defines an end portion 8 through which the annular projection 6 may be inserted to a position inwardly of the ring 7.

The annular groove 5 has an inside diameter greater than an outside diameter of the annular projection 6 by a difference not less than a radial thickness of the ring 7.

The ring 7 is C-shaped with a cut at one peripheral position thereof to be elastically deformable radially outwardly inside the annular groove 5.

The annular projection 6 is located inside the intermediate sleeve 2 further inwardly from the ring 7. The intermediate sleeve 2 defines a constricted portion 9 on the inner peripheral wall thereof for contacting the annular projection 6, to determine a maximum insertion depth of the sleeve pipe 1 relative to the intermediate sleeve 2. The sleeve pipe 1 is retained in place against detachment from the intermediate sleeve 2 by the ring 7 engaging the annular groove 5 and annular projection 6. In this way, the sleeve pipe 1 and intermediate sleeve 2 are axially slidable relative to each other within a limited range.

The casing pipe 4 includes flanges 11 formed integrally therewith. These flanges 11 are connected by bolts to the flanges 1a of the respective sleeve pipes 1, thereby fixing positional relations between the casing pipe 4 and sleeve pipes 1.

Figure 3:
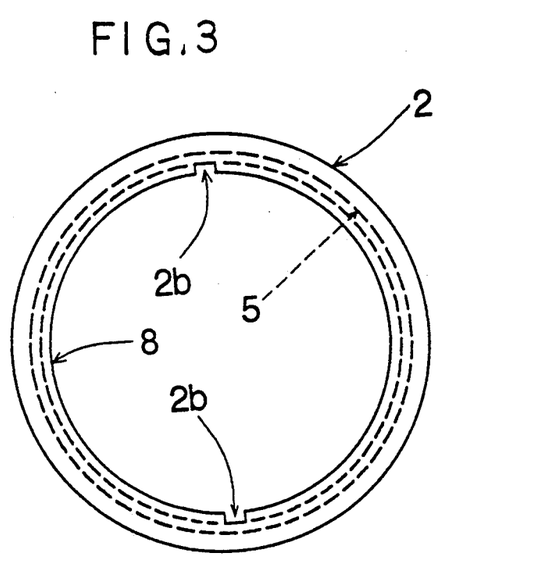
FIG. 3 is a front view of an intermediate sleeve.
Figure 4:
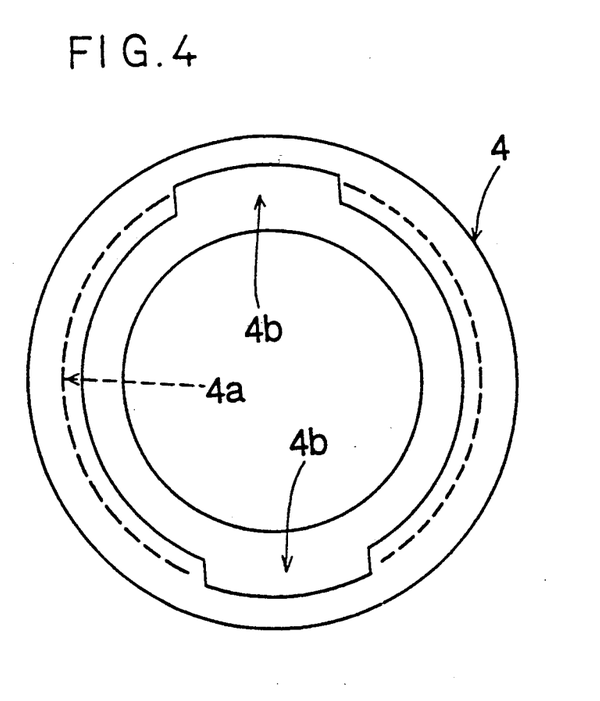
FIG. 4 is a front view of a casing pipe.

As shown in FIG. 3, the end portion 8 of each intermediate sleeve 2 includes cutouts 2b formed in two, diametrically opposite positions and extending between outer surfaces of the intermediate sleeve 2 and the annular groove 5. Further, as shown in FIG. 4, the casing pipe 4 also includes cutouts 4b formed in two, diametrically opposite positions of each end region thereof and extending between outer surfaces of the casing pipe 4 and the spherical inner surface 4a.

The way the flexible pipe joint is assembled will be described next with reference to FIGS. 5 through 7.

Figure 5:
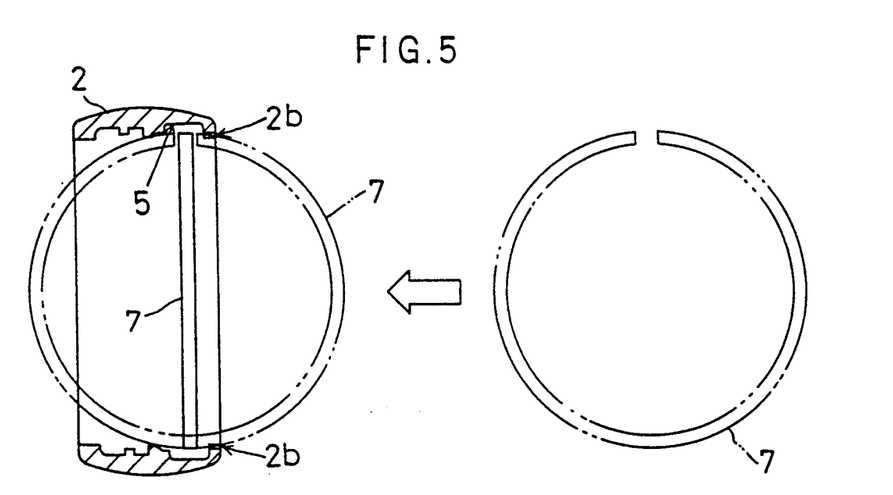
FIGS. 5 through 7 are explanatory views illustrating an assembly operation.

As shown in FIG. 5, each ring 7 is placed in the annular groove 5 by inserting the ring 7 through the cutouts 2b with the radial direction of the ring 7 extending axially of the intermediate sleeve 2. The ring 7 is thereafter turned inside the annular groove 5 to be coaxial with the intermediate sleeve 2.

Figure 6:
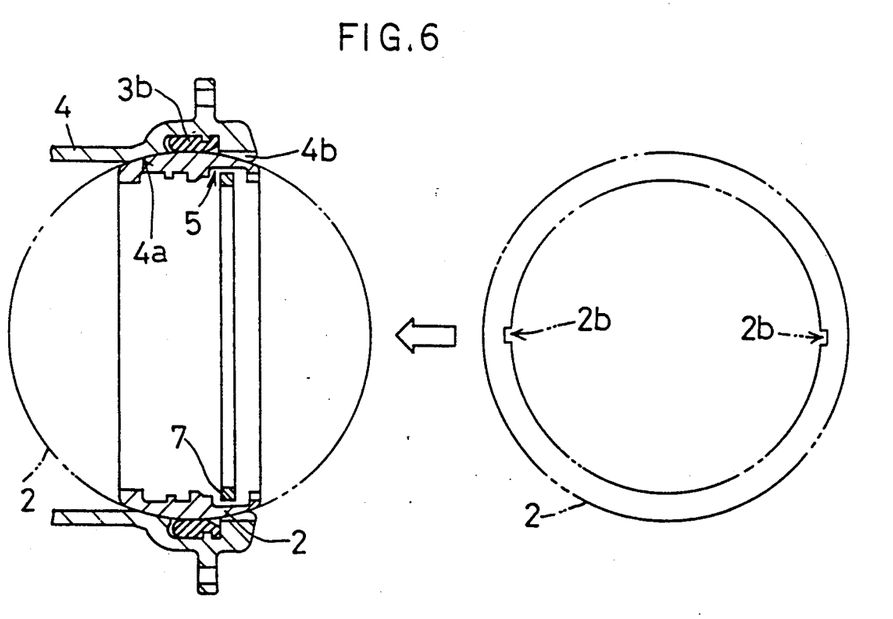
Figure 7:
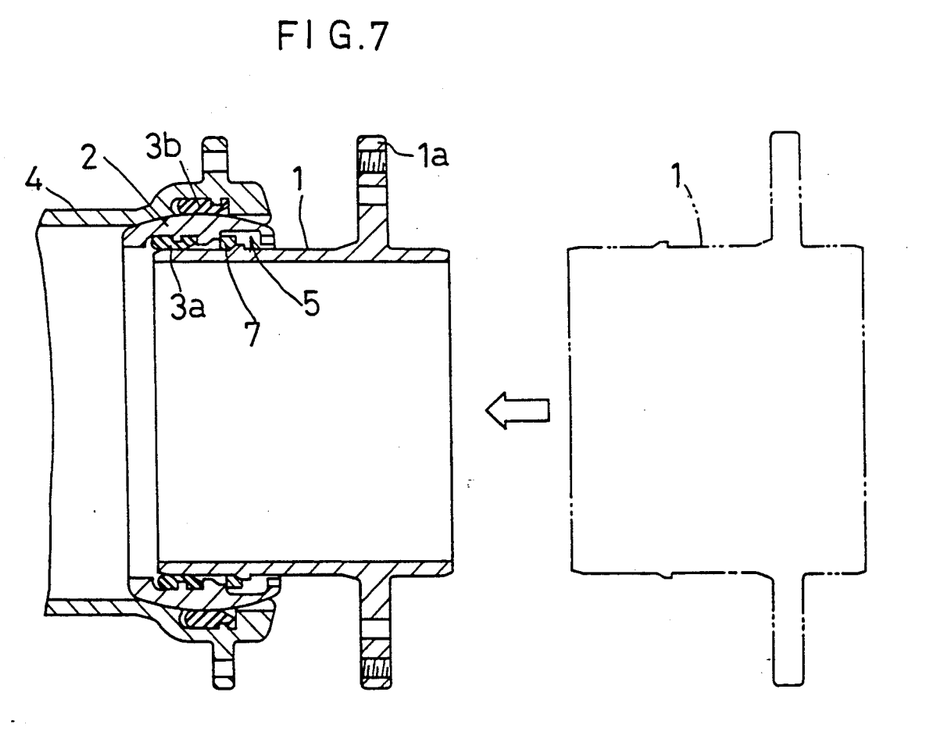

Next, as shown in FIG. 6, each rubber ring 3b is fitted in the casing pipe 4, and a lubricant is applied in an appropriate quantity to surfaces of the rubber ring 3b and the intermediate sleeve 2 with the ring 7 placed therein. The intermediate sleeve 2 is fitted in the spherical inner surface 4a of the casing pipe 4 by inserting the intermediate sleeve 2 through the cutouts 4b with the radial direction of the intermediate sleeve 2 extending axially of the casing pipe 4. Subsequently, the intermediate sleeve 2 is turned with the spherical outer surface 2a in slidable contact with the spherical inner surface 4a of the casing pipe 4. After the intermediate sleeve 2 becomes coaxial with the casing pipe 4, the rubber ring 3a is fitted into the intermediate sleeve 2.

Then, the lubricant is applied in an appropriate quantity to surfaces of the rubber ring 3a and sleeve pipe 1. As shown in FIG. 7, the sleeve pipe 1 is inserted into the intermediate sleeve 2 by using lever blocks or draw-in bolts (not shown). The sleeve pipe 1 is passed through the ring 7, to sandwich the ring 7 between the annular projection 6 and an inside wall of the annular groove 5.

Figure 8:
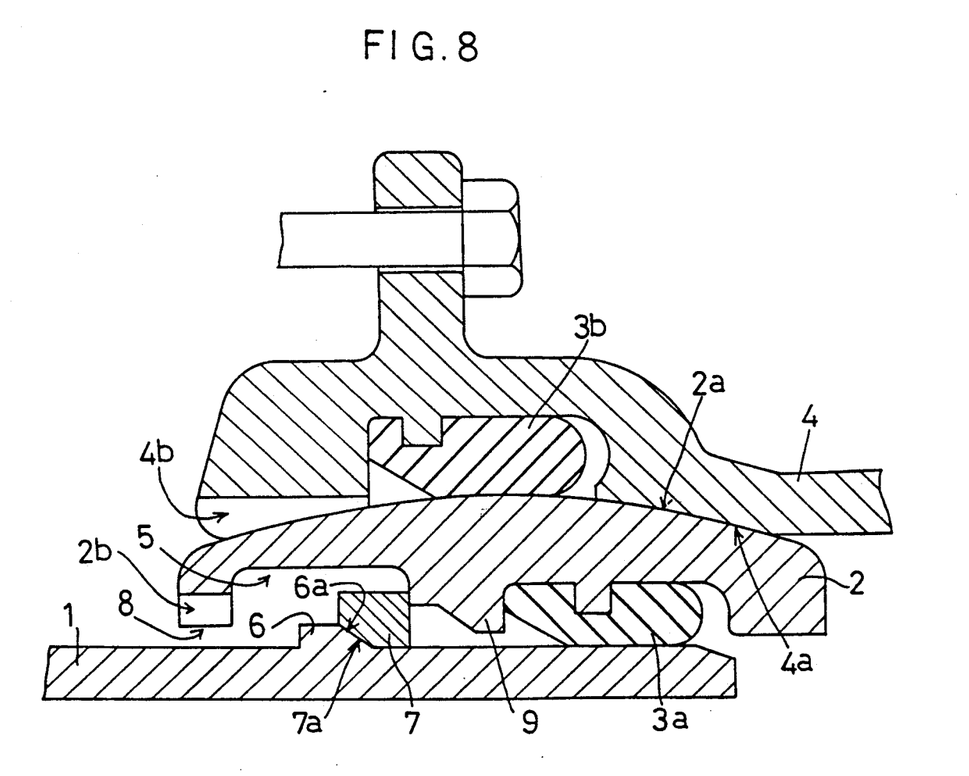
FIG. 8 is an enlarged sectional view similar to FIG. 2.

The sleeve pipe 1 is further pushed in in this state. Then, as shown in FIG. 8, the ring 7 is elastically deformed radially outwardly in the annular groove 5 with a guiding action provided by a tapered surface 7a formed on an inside wall of the ring 7 and a tapered surface 6a formed on the annular projection 6. Consequently, the annular projection 6 is placed deeper inside than the ring 7.

A different embodiment will be described hereinafter.

Figure 9:
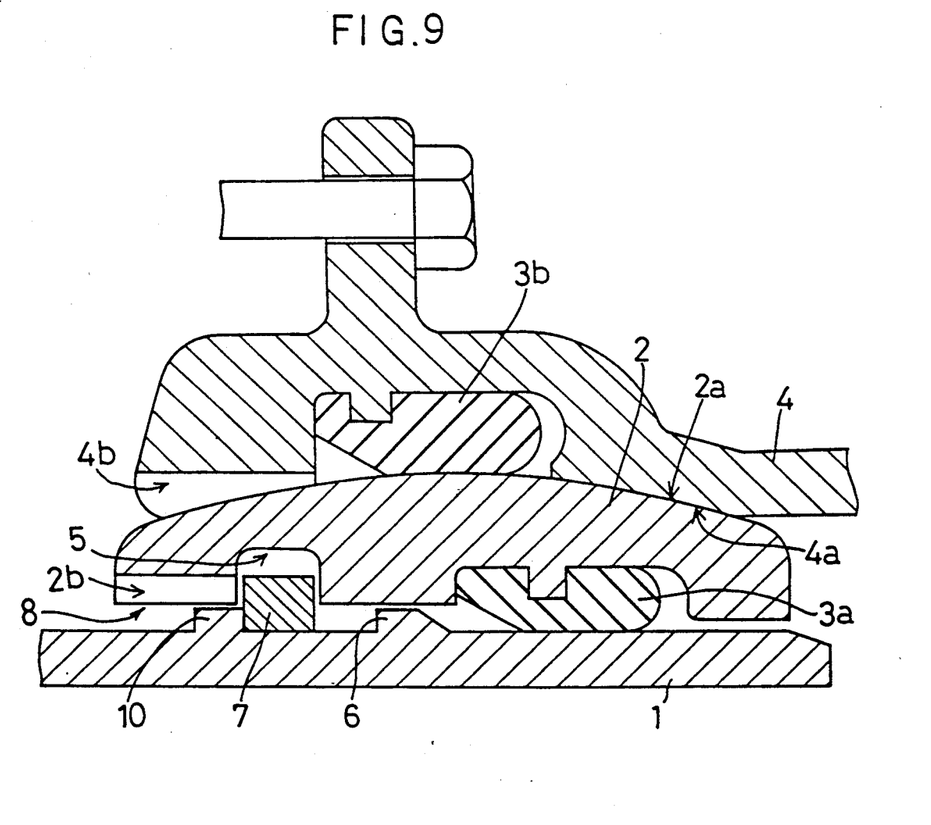
FIG. 9 is an enlarged sectional view similar to FIG. 2 showing a different embodiment.

As shown in FIG. 9, an outer sleeve 2 defines an annular groove 5 having approximately the same width as a ring 7. The ring 7 is fitted into the annular groove 5 and between two annular projections 6 and 10 formed on an inner sleeve 1. The inner sleeve 1 is retained inside the outer sleeve 2 by engagement between the annular projection 6 and ring 7. Engagement between the other annular projection 10 and ring 7 determines a maximum insertion depth of the inner sleeve 1 relative to the outer sleeve 2. In this way, the inner sleeve 1 and outer sleeve 2 are axially slidable relative to each other within a limited range.

This embodiment has the advantage of facilitating assembly of the inner sleeve 1 to the outer sleeve 2 in that the ring 7 is set to the outer sleeve 2 to be little displaceable axially thereof. This embodiment is the same as the preceding embodiment in the other aspects.

The present invention may be modified in various ways as follows:

(a) An expansion pipe joint according to the present invention may include an inner sleeve and an outer sleeve directly coupled to pipes, respectively. This pipe joint then does not have the function to couple the two pipes flexibly.

(b) An expansion pipe joint according to the present invention may include a plurality projections arranged at intervals along an annular track.

(c) The flexible expansion pipe joints described in the foregoing embodiments may be modified to include only one set of sleeve pipe 1 and intermediate sleeve 2 axially slidably fitted together and mounted in a casing pipe 4. In this case, an extendible and contractible and flexible coupling is provided between a pipe directly connected to the casing pipe 4 and a pipe connected to the sleeve pipe 1.

What is claimed is:

1. An expansion pipe joint comprising:
a pair of inner sleeve means, having substantially the same shape, each said inner sleeve means including an annular projection formed on an outer surface thereof;
a pair of outer sleeve means, having substantially the same shape, for receiving said pair of inner sleeve means to be axially slidable relative to and inseparable from said pair of inner sleeve means, each of said outer sleeve means including an annular groove formed on an inner surface thereof;
ring means mounted in said annular groove for engaging said annular groove and said annular projection along a circumferential direction;
a casing pipe surrounding said pair of outer sleeve means and interconnecting said pair of outer sleeve means;
wherein each of said outer sleeve means defines an inner end portion through which said annular projection is inserted to a position spaced further from said inner end portion than said ring means;
said ring means is C-shaped with a portion thereof cut out so as to be elastically deformable radially outwardly; and
said annular projection is placed further from said inner end portion than said ring means by elastically deforming said ring means radially outwardly in said annular groove.

2. An expansion pipe joint as claimed in claim 1, wherein said pair of outer sleeve means and said casing pipe contact each other through a spherical outer surface of each of said outer sleeve means and a spherical inner surface of said casing pipe.

3. An expansion pipe joint as claimed in claim 2, wherein said casing pipe includes a flange formed integral therewith and connected through connecting means to a flange of each of said inner sleeve means to fix a positional relationship between said casing pipe and said pair of inner sleeve means.

4. An expansion pipe joint as claimed in claim 1, wherein each of said outer sleeve means includes a projection formed on an inner surface thereof for contacting said annular projection to determine a maximum insertion depth between said pair of inner sleeve means and said pair of outer sleeve means.

5. An expansion pipe joint as claimed in claim 4, said annular projection and said pair of outer sleeve means contact each other through inclined surfaces formed thereon, respectively.

6. An expansion pipe joint as claimed in claim 1, wherein said annular groove has approximately the same width as said ring means, said ring means being fitted into said annular groove and between two annular projections formed on each of said inner sleeve means, said pair of inner sleeve means being retained in said pair of outer sleeve means by engagement between one of said annular projections and said ring means, and engagement between the other annular projection determining a maximum insertion depth of said pair of inner sleeve means relative to said pair of outer sleeve means, thereby determining a range of relative sliding between said pair of inner sleeve means and said pair of outer sleeve means.

* * * * *